United States Patent Office 3,171,698
Patented Mar. 2, 1965

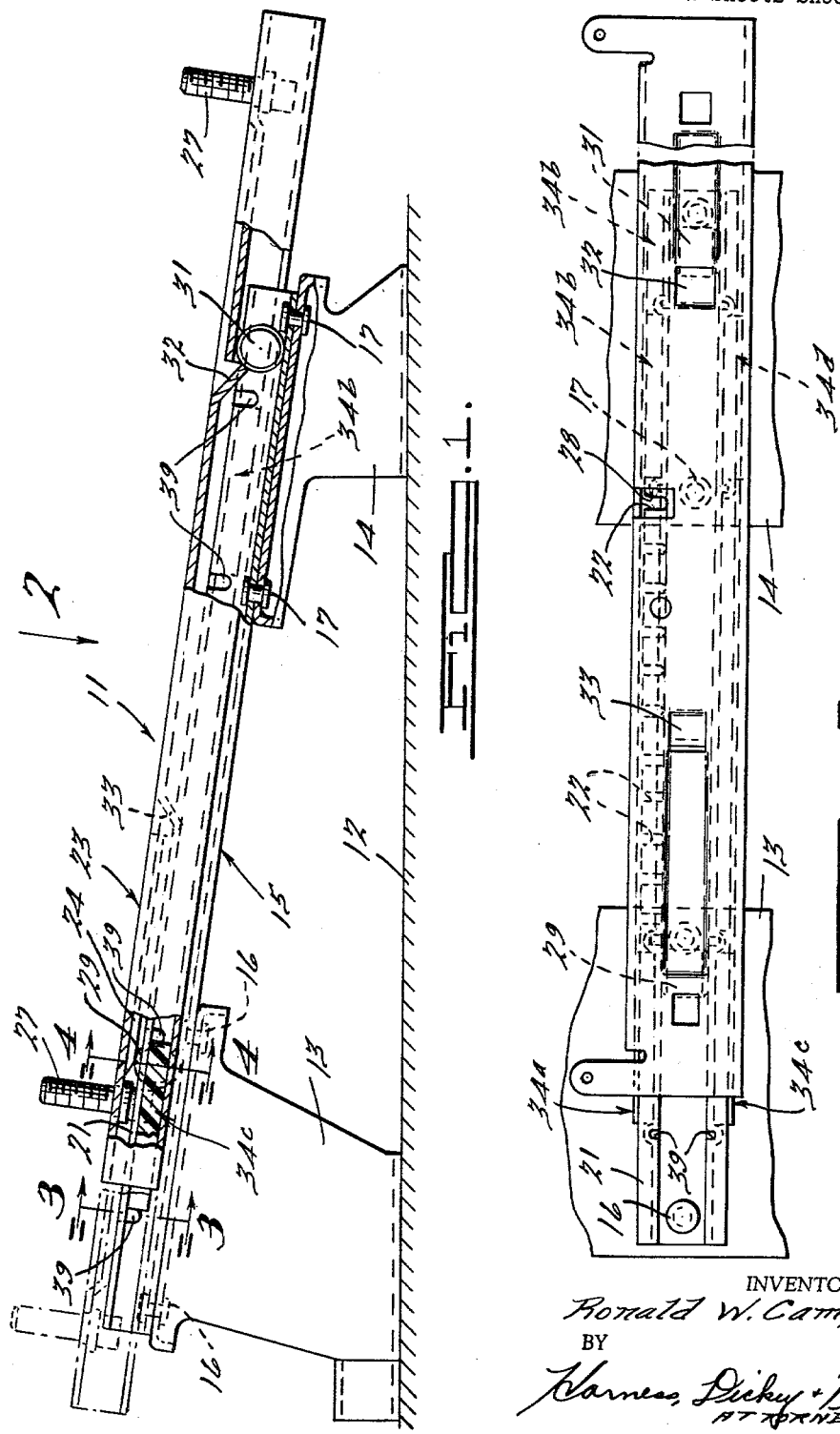

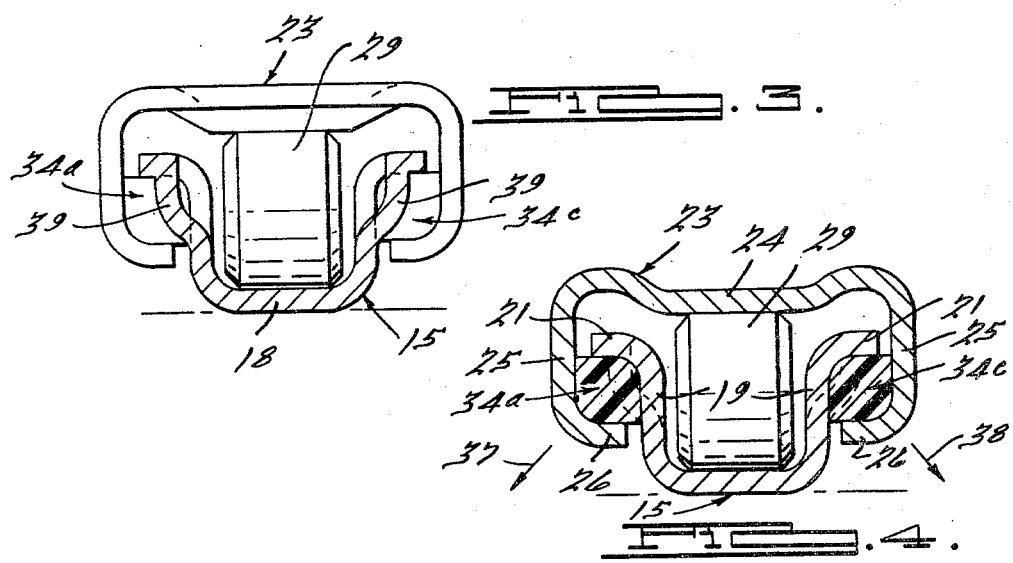
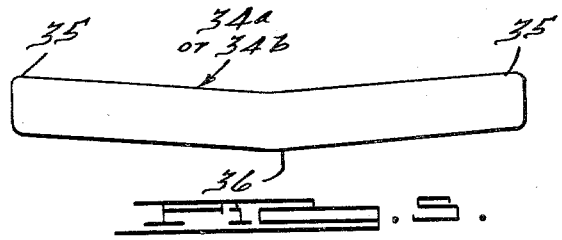
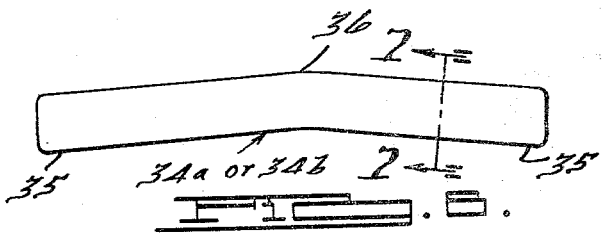

3,171,698
SEAT SLIDE MECHANISM
Ronald W. Campbell, Jackson, Mich., assignor to Hancock Industries, Inc., Jackson, Mich., a corporation of Michigan
Filed Aug. 29, 1962, Ser. No. 220,184
5 Claims. (Cl. 308—3.8)

This invention relates to seat slide mechanisms, and more particularly to those used for adjusting the front seats of automotive vehicles.

A common type of automotive seat slide mechanism utilizes a pair of fixed lower tracks and a pair of upper tracks secured to the underside of the seat and supported on the lower tracks by rollers. If the dimensional tolerances used in manufacturing the seat slide components permit vertical or horizontal play between the upper and lower tracks, undesirable rattling may occur during driving if the upper tracks are not held on the rollers by the weight of a passenger. For example, in the case of individually adjustable front seats such as the so-called "bucket" seats, the tracks supporting an empty passenger seat could be subjected to such rattling.

It is an object of the invention to provide a novel and improved seat slide mechanism which permits the track components to be manufactured with relatively liberal dimensional tolerances while still providing a rattle-free assembly, even after continued use.

It is another object to provide an improved seat slide construction of this character in which the force required for adjusting the seat is relatively low.

Other objects, features, and advantages of the present invention will become apparent from the subsequent description, taken in conjunction with the accompanying drawings, in which:

FIGURE 1 is a side elevational view, partly sectioned, showing a suitable embodiment of the invention;

FIGURE 2 is a top plan view of the seat slide assembly looking in the direction of arrow 2 of FIGURE 1, parts being omitted for clarity;

FIGURE 3 is a cross-sectional view taken along the line 3—3 of FIGURE 1 and showing the interrelationship between the upper and lower tracks as well as the construction of the insert retaining means;

FIGURE 4 is a cross-sectional view taken along the line 4—4 of FIGURE 1 and showing the cross-sectional shape of a pair of inserts;

FIGURE 5 is a top plan view of an insert in its unstressed condition showing its configuration;

FIGURE 6 is a side elevational view of the insert of FIGURE 5 in its unstressed condition further showing the configuration thereof; and FIGURE 7 is a cross-sectional view taken along the line 7—7 of FIGURE 6 and showing the cross-sectional shape of the insert.

Briefly, the illustrated embodiment of the invention comprises a seat slide assembly having a lower track of generally inverted U-shaped cross section and with outturned upper flanges, and an upper track of generally inverted U-shaped cross section and with inturned lower flanges underlying the lower track flanges and in spaced relation therewith. Rollers are disposed between the tracks to support the load of the upper track and permit it to be moved longitudinally with respect to the lower track.

A plurality of inserts are provided between the overlapping flanges of the upper and lower tracks. Each insert comprises an elongated flexible and resilient member of low-friction material having a slightly bowed configuration in its unstressed condition, so that when placed between the flanges, its central portion will be forced against one track and its ends against the other. The inserts thus exert a downward force and oppositely directed outward forces on the upper track, holding it against the rollers and inhibiting upward as well at lateral movement. At the same time, the inserts exert relatively little frictional resistance to longitudinal movement of the upper track. The downward and outward forces will be exerted by the inserts on the upper track regardless of variations on the spacing between the flanges, which variations may occur between different assemblies or along the extent of the flanges in any individual assembly. Retaining portions struck out from the lower track are engageable with the ends of the inserts to restrain them against longitudinal movement during adjustment of the upper track.

Referring more particularly to the drawings, a single seat slide assembly is indicated generally at 11 in FIGURE 1, it being understood that in automotive installations a pair of assemblies 11 would ordinarily be installed in parallel relation to support each seat on a floor 12. Assembly 11 comprises a forward bracket 13 and a rear bracket 14 secured to floor 12 and extending upwardly therefrom. A lower track generally indicated at 15 is secured to brackets 13 and 14 by sets of rivets 16 and 17, respectively.

Lower track 15 is of generally U-shaped cross section, having a central portion 18, upwardly extending side portions 19, and flanges 21 extending outwardly from the upper ends of side portions 19. A plurality of notches 22 may be provided in one flange 21 for cooperation with a locking mechanism (not shown) for holding the seat slide in its adjusted position.

An upper track generally indicated at 23 surmounts lower track 15. Upper track 23 is of generally inverted U-shaped cross section, having a central portion 24, a pair of side portions 25 extending downwardly from portion 24, and a pair of flanges 26 extending inwardly from the lower ends of side portions 25. Side portions 25 are spaced outwardly from the outer ends of flanges 21 and extend therebelow, flanges 26 extending under and spaced below flanges 21. The junctures of flanges 21 with side portions 19, as well as the junctures of flanges 26 with side portions 25, are of a curved nature as seen in FIGURE 4. Posts 27 are secured to the forward and rearward ends of track 23 for securing thereto a seat (not shown) or other object to be supported. A clearance notch 28 is also provided in track 23, as seen in FIGURE 2, for permitting access of the aforementioned locking mechanism to notches 22.

A pair of rollers 29 and 31 are disposed between tracks 15 and 23, these rollers being engageable with central portions 18 and 24 of the tracks, as seen in FIGURE 4. The width of rollers 29 and 31 is such that they are spaced slightly inwardly from side portions 19 of lower track 15. Rollers 29 and 31 are spaced longitudinally from each other, roller 29 being adjacent the forward end of seat slide assembly 11 and roller 31 being adjacent the rearward end. The rear position of track 23, shown in solid lines in FIGURE 1, is defined by a stop 32 struck downwardly from the central portion 24 of upper track 23 as seen in FIGURE 1, this stop being engageable with roller 31. The forward position of track 23, shown in dot-dash lines in FIGURE 1, is defined by a similar down-struck stop 33 spaced forwardly from stop 32, stop 33 being engageable with roller 29.

The above-described elements of seat slide assembly 11 are of a conventional nature. It will be observed that as long as a substantial weight is being supported by assembly 11, upper track 23 will be held against rollers 29, even when the car is in motion, preventing rattling of the parts due to vertical or horizontal motion of the upper track with respect to the lower track. However, the absence of such weight would permit vertical or horizontal motion to occur due to the normal vibrations of the vehicle, and the upper track would be caused to repeatedly strike against the rollers or the lower track and the rollers to strike against both the upper and lower tracks. Undesired rolling or shifting of the rollers between the tracks could also occur under these circumstances. An example of a situation in which such an absence of weight would occur is in the case of separate front seats in automobiles, each seat being individually adjustable on its own set of seat slides.

One manner of attempting to avoid this rattling or vibrational situation has been to so shape the slide components as to maintain constant pressure between the flanges of the upper and lower tracks. This solution, however, presents a serious problem in that a high frictional force would be constantly present between the engaging flanges, making it difficult for the passenger to shift the seat. Moreover, rather close manufacturing tolerances would have to be observed in order to assure constant engagement between the flanges.

Another attempted solution to this problem has been the placing of hard steel balls between the spaced flanges of upper and lower tracks, the flanges being forced toward each other after assembly, creating slight depressions in the flanges at the locations of the balls when the forcing operation takes place, but diminishing the space between the flanges so that the balls force the upper track downwardly and outwardly when they are not located at the depressions. However, this construction has proved unsatisfactory for long-term use because the balls gradually wear grooves in the softer steel track flanges, thus recreating the spacing which induces the rattling effect.

According to the present invention, a plurality of inserts generally indicated at 34 are provided between flanges 21 and 26, these inserts being so constructed and disposed as to create a light but continuous downward force and oppositely directed lateral or outward forces on upper track 23, holding it against rollers 29.

In the illustrated embodiment of the invention, each insert 34 has an unstressed configuration similar to that seen in FIGURES 5 and 6, and is fabricated as an elongated block of a resilient and flexible material having low frictional characteristics. One material which has been found suitable for this purpose is the plastic material known by the trade name Delrin.

The cross-sectional shape of each insert member 34 is seen in FIGURE 7, this shape being such that member 34 will fit within the space formed by facing flanges 21 and 26 and the adjacent zones of side portions 19 and 25, respectively; these areas are seen in FIGURES 3 and 4.

Assuming that a member 34 were unstressed but in the same orientation as it would have when in assembly 11, it would have a configuration similar to that seen in FIGURE 5 when viewed from the top. That is, unstressed member 34 is slightly bowed, having ends 35 which are displaced to one side from the central portion 36. The direction of the bow shown in FIGURE 5 is that which inserts 34a and 34b on the left-hand side (in FIGURE 4) of assembly 11 would have if viewed from the top, as in FIGURE 2; two said inserts are provided, indicated at 34a and 34b in FIGURE 2. Inserts 34c and 34d on the other side of assembly 11 would be bowed in the opposite direction from that shown in FIGURE 5 if viewed from the top. When viewed from the side, members 34a and 34b appear as shown in FIGURE 6, with a downward bow from the central portion 36 to the ends 35.

In installed position, the effect of the bowed shape of members 34a and 34b is to create a downwardly and outwardly inclined force on upper track 23 in the direction of arrow 37 in FIGURE 4. The effect of inserts 34c and 34d is to create a downwardly and outwardly inclined force on track 23 in the direction of arrow 38 in FIGURE 4. This is because the dimensions of the parts are such that members 34 will be at least partially flattened when confined within the spaces created by the facing and overlapping portions of tracks 15 and 23. The cross-sectional shape of members 34 is such as to fit within these spaces only when in the positions illustrated in FIGURE 4 or rotated 180° from these positions. The forces represented by the arrows 37 and 38 are created by engagement of central portions 36 of inserts 34 with one track (track 15 in the illustrated positions of the inserts) and the engagement of ends 35 of the inserts with the other track. Since the lateral components of the forces represented by arrows 37 and 38 substantially counterbalance each other, the resultant force will be vertically downward, holding track 23 against rollers 29 and thus preventing rattling of the assembly by vertical movement of track 23. The opposing lateral force components of members 34 will inhibit substantial sideward or horizontal movement of track 23 in either direction from its central position as illustrated in FIGURE 4.

Means are provided for retaining inserts 34 against longitudinal shifting movement when track 23 is shifted. This means includes eight retaining portions 39 partially severed or struck out from track 15 adjacent the ends of members 34 so as to be in blocking relation therewith. Each retaining portion 39 extends from an intermediate section of a side portion 19 of track 15 through the juncture between portions 19 and 21 to an intermediate section of flange 21. The locations of member 34 and therefore of retaining portions 39 are adjacent the forward and rearward ends of stationary track 15, but are spaced a sufficient distance from these ends to insure the exertion of a downward force on track 23 regardless of the longitudinal position of this track with respect to stationary track 15.

In operation, upper track 23 may be longitudinally adjusted between the solid and dot-dash line positions of FIGURE 1 and locked in any adjusted position by engagement of a locking member (not shown) in a selected notch 22 of stationary track 15. During such adjusting movement, upper track 23 will roll on rollers 31, the latter providing the entire bearing support for track 23 and the weight to which it is subjected. Side portions 25 and flanges 26 of track 23 will slide along the facing surfaces of members 34, and particularly the ends 35 thereof which are being forced against track 23 in the directions of arrows 37 and 38. These forces, however, will be relatively light, and the low-friction properties of the material from which inserts 34 are fabricated will mean that very little frictional resistance to the longitudinal shifting movement of track 23 will be present.

Should the dimensions of upper track 23 vary along its extent in such manner that the space occupied by any or all inserts 34 varies, the flexibility of the inserts will automatically compensate for this spacing variation. Variations in spacing between different assemblies 11, due to differences in dimension between tracks 15 and tracks 23, will also be automatically compensated for when inserts 34 are installed. While the actual force exerted by each member 34 will vary with its deflection, the load-deflection rate of members 34 is so calculated that the friction resulting from these forces will be kept at a minimum consistent with a rattle-free assembly. The rattle-free nature of the assembly in any adjusted position of track 23 will of course be provided by the fact that sufficient downward and outward forces are exerted by inserts 34 on track 23 even when no substantial weight is being supported by the track.

While it will be apparent that the preferred embodiment of the invention disclosed is well calculated to fulfill the objects above stated, it will be appreciated the invention is susceptible to modification, variation and change without departing from the proper scope or fair meaning of the subjoined claims.

What is claimed is:

1. In a seat slide mechanism, a fixed lower track, an upper track, load bearing means between said tracks permitting longitudinal movement of the upper track with respect to the lower track, facing portions on said tracks spaced from said load bearing means, and a plurality of resilient flexible bowed insert members of low-friction material disposed between said facing portions and each having an unstressed size greater than the maximum spacing between said facing portions, said members being compressed between said facing portions whereby the internal resiliency of said members urging them to return to their unstressed size will cause the members to exert a constant force on said upper track urging it toward said load bearing means.

2. In a seat slide mechanism, a fixed lower track having a central portion, upwardly extending side portions, and outwardly extending flanges at the upper ends of said side portions, an upper track having a central portion, downwardly extending side portions outwardly of said lower track flanges, and inwardly directed flanges below said lower track flanges, a plurality of load bearing rollers between the central portion of said tracks, and a plurality of bowed insert members separate from said rollers and disposed between the facing side portions and flanges of said tracks, said insert members each having an unstressed size greater than the maximum spacing between said facing portions, said members being compressed between said facing portions whereby the internal resiliency of said members urging them to return to their unstressed size will cause the members to exert a constant downward force on said upper track.

3. In a seat slide mechanism, a fixed lower track having outwardly extending flanges, an upper track having inwardly directed flanges below said lower track flanges, a plurality of load bearing rollers between said tracks, and a plurality of insert members separate from said rollers and disposed between the facing flanges of said tracks, each of said insert members comprising an elongated member fabricated of material having low frictional properties, each of said insert members being bowed in its unstressed condition, the direction and extent of said bowed shape relative to the spacing between said flanges being such that said insert members will exert a constant downward force on said upper track.

4. The combination according to claim 3, further provided with retaining portions on said lower track and engageable with said insert members to prevent longitudinal movement thereof.

5. In a seat slide mechanism, a fixed lower track having a central portion, upwardly extending side portions, and outwardly extending flanges at the upper ends of said side portions, an upper track having a central portion, downwardly extending side portions outwardly of said lower track flanges, and inwardly directed flanges below said lower track flanges, a plurality of load bearing rollers between the central portion of said tracks, and a plurality of insert members separate from said rollers and disposed between the facing side portions and flanges of said tracks, each of said insert members comprising an elongated member fabricated of material having low frictional properties, each of said insert members being bowed in its unstressed condition, the direction and extent of said bowed shape relative to the spacing between said flanges being such that said insert members will exert a constant downward force and constant oppositely directed horizontal lateral forces on said upper track.

References Cited in the file of this patent
UNITED STATES PATENTS

| | | |
|---|---|---|
| 2,307,305 | Saunders et al. | Jan. 5, 1943 |
| 2,609,256 | Baker et al. | Sept. 2, 1952 |
| 2,759,773 | Wilmer et al. | Aug. 21, 1956 |
| 2,828,668 | De Angelis | Apr. 1, 1958 |
| 2,840,139 | Ragsdale | June 24, 1958 |
| 2,842,410 | Neidhart | July 8, 1958 |
| 2,851,314 | Thomson | Sept. 9, 1958 |